United States Patent [19]

Matsuba

[11] Patent Number: 4,734,770
[45] Date of Patent: Mar. 29, 1988

[54] IMAGE DATA PROCESSING METHOD AND DEVICE THEREFOR

[75] Inventor: Ikuo Matsuba, Sagamihara, Japan

[73] Assignee: Hitachi, Ltd., Tokyo, Japan

[21] Appl. No.: 13,541

[22] Filed: Feb. 11, 1987

[30] Foreign Application Priority Data

Mar. 13, 1986 [JP] Japan ................................ 61-53678
Nov. 7, 1986 [JP] Japan ................................ 61-263914

[51] Int. Cl.$^4$ ............................................. H04N 5/213
[52] U.S. Cl. ..................................... 358/167; 358/36; 382/54; 364/807
[58] Field of Search ................... 358/167, 36, 166, 37, 358/140, 133; 364/513, 514, 191, 192, 169, 807, 723, 725, 728; 382/15, 17, 41, 43, 54

[56] References Cited

U.S. PATENT DOCUMENTS

| | | | |
|---|---|---|---|
| 4,408,343 | 10/1983 | Neill | 382/54 |
| 4,539,703 | 9/1985 | Clearman | 382/28 |
| 4,601,055 | 7/1986 | Kent | 358/166 |
| 4,641,352 | 2/1987 | Fenster | 382/54 |
| 4,672,444 | 6/1987 | Bergen | 358/140 |
| 4,692,892 | 9/1987 | Anizan | 364/807 |

Primary Examiner—Tommy P. Chin
Attorney, Agent, or Firm—Antonelli, Terry & Wands

[57] ABSTRACT

An image data processing method for restoring an image worsened by non-linear characteristics of a transforming system, noises and others is disclosed, by which a quantity called energy function, in which the noises and others described above are taken into consideration, is defined, and treatments for modifying stochastically the value of the gray level of each of the pixels are repeated so that a probability determined by this energy function is made greatest and the function $E(\{x_{i,j}\})$ represented by the following equation is adopted for the energy function stated above;

$$E(\{x_{i,j}\}) = \sum_{<k,l>} (x_{i,j} - x_{k,l})^2 + \alpha(y_{i,j} - f(x_{i,j}))^2,$$

where $x_{k,l}$ is the value of the gray level of the group of pixels directly adjacent to the sides of the object pixel $x_{i,j}$; $y_{i,j}$ is the value of the gray level at that time of the object pixel; $f(x_{i,j})$ is the value corresponding to the true gray level of the object pixel obtained through the transformation system for transforming image signals into a first image data; and $\alpha$ is a coefficient.

13 Claims, 21 Drawing Figures

→ IMAGE DATA

IMAGE DATA PROCESSING METHOD AND DEVICE THEREFOR

BACKGROUND OF THE INVENTION

1. Field of the Invention

This invention relates to an image data processing method and a device for realizing it and more in detail to an image data processing method and a device for realizing it, in which original images are restored by treating stochastically image data deteriorated by noises, etc. by means of a computer.

2. Description of the Prior Art

One of the treatment methods for restoring images deteriorated by noises, non-linear characteristics of a converter system, etc. consists in detection or clarification of edges and in order to effect it, heretofore, the Laplacian processing has been often utilized. A Laplacian in image data means a variable quantity representing the difference between gray levels of pixels adjacent to each other in the line or direction and it can be given by the following formula:

Laplacian $(x_{i,j}) = (x_{i+1,j} - x_{i,j}) -$ $$(x_{i,j} - x_{i-1,j}) + (x_{i,j+1} - x_{i,j}) - (x_{i,j} - x_{i,j-1})$$

where $x_{i,j}$ represents the gray level of the pixel at the i-th row and the j-th line. Since the absolute value of the Laplacian has in general a great value at a point, where the pixel gray level begins to vary rapidly, it is efficacious for detecting the edge of an image pattern.

However the absolute value of the Laplacian is great also at a point, where the pixel gray level varies rapidly because of noises. Consequently the Laplacian processing provokes accentuation of the noises at the same time as the detection of the edge and as the result makes elimination of the noises difficult. On the other hand, if any smoothing processing is effected in order to remove the noises, not only it removes the noises, but also it makes the edge vague, what makes the detection thereof difficult. Studies on the integrating image restoration reconciling these two processings, which seem at first sight to be hardly consistent with each other, have not been noticeably developed up to the latest date.

An example of image data processings, by which noise components are removed by effecting iteratively treatments to update pixel values according to a predetermined rule, while checking the relation between the value of each of the pixels and that of pixels adjacent thereto, has been reported in an article entitled "Stochastic Relaxations, Gibbs Distributions, and Bayesian Restoration of Images" in *IEEE TRANSACTIONS ON PATTERN ANALYSIS AND MACHINE INTELLIGENCE*, Vol. PAM I-6, No. 6, November 1984, pp. 721-741. In the image data processing described in this article a quantity called "energy function" represented by a function of the gray level of each of the pixels, the gray level of the pixels adjacent thereto and boundary elements, which can exist therebetween. A restored image is obtained by effecting a treatment to modify stochastically the gray level of each of the pixels so that the value of a probability determined by this energy function and by iterating this process, while reducing progressively a parameter called temperature.

Although the article stated above suggests that the algorithm of the image data processing described above is suitable for parallel treatments, it discloses no concrete construction of the processing device therefor.

Further the description of the article stated above is highly scientific and abstract and how the energy function stated above or a function called potential, on the basis of which the energy function is formed, can be determined concretely is not disclosed there. For this reason it is a problem how the energy function permitting to make the elimination of noises and the detection of pattern edges compatible, when putting it to practical use, is determined concretely.

SUMMARY OF THE INVENTION

An object of this invention is to provide an image data processing method permitting to restore an image, from which noises are removed, by iterating treatments to modify the value of each of the pixels, starting from image data containing noises.

Another object of this invention is to provide an image data processing system permitting to obtain an image, from which noises are removed by effecting treatments to modify the value of each of the pixels, starting from image data containing noises.

In order to achieve one of the objects described above, by the image data processing method according to this invention, an image energy is defined, in order to obtain, for each of the pixels constituting an image, the gray level, which the relevant pixel should have, which image energy consists of a first term, the differential of which with respect to the gray level of the relevant pixel is proportional to its Laplacian, and a second term, which is proportional to the square of the noise produced in the pixel (which noise corresponds to the difference between the value representing the gray level at that time of the relevant pixel and that representing the true gray level of the pixel). The image energy has a property that its value is minimum, when a gray level, which is closest to the true gray level, is given to the relevant pixel. Therefore it is possible to find a candidate value for the most probable gray level, which should be given to the object pixel, by calculating an image energy corresponding to each of the values of the gray level, which the pixel can have, and by comparing the values.

According to this invention, in order that it is possible to judge whether the gray level at that time of the relevant pixel should be changed to the candidate value stated above or not, a probability formula including the image energy in its exponent is used and the modification of the gray level is effected by stochastical treatments represented e.g. by the Monte Carlo method, by which the ratio q the value of the probability, in the case where the gray level at that time of the relevant pixel is replaced by the candidate value, to the value of the probability, in the case where the gray level at that time of the relevant pixel is maintained, is used as a parameter for the judgment. That is, the value of q is compared with a uniform random number $\eta$ ($0 \leq \eta \leq 1$) and whether the gray level of the relevant pixel should be updated or not is determined by which is greater between them.

The probability formula has a maximum, when the image energy is minimum, i.e. when the differential value of the image energy is "0", and at this time the Laplacian at the position of the relevant pixel has a value, which is proportional to the modification quantity of the gray level. Consequently, by the image data processing method according to this invention, by which the gray level of each of the pixels in the image data is updated so that the probability is maximum, the object pixel is not modified so that the Laplacian is "0", but the modification is effected in the form that the Laplacian is maintained in some extent in the original data. In this way, noise components are removed without making the edge of the pattern vague.

Further the image processing system proposed by this invention comprises a plurality of multistage shift register means and a plurality of operation means executing operations of same type. These shift register means are connected in series in a ring and form a single ring shift register mechanism. Each of the operation means is connected with one of several particular stages in this ring shift register mechanism. Inputted image data are distributed to these shift register means so that the relative position of the pixels in the inputted image is maintained.

The image data circulate in the ring shift register mechanism, while maintaining the relative position, and predetermined operations are executed, every time they arrive at one of the stages connected with the operation means. During the period of time where they circulate once in the ring shift register mechanism, the iterative operations, whose number is equal to that of the operation means, are terminated for all the pixels, and thus the image processing necessitating a great number of iterative operations is terminated in a short time.

The foregoing and other objects, advantages, manner of operation and novel features of the present invention will be understood from the following detailed description when read in connection with the accompanying drawings.

DESCRIPTION OF THE PREFERRED EMBODIMENTS

Figure 1:
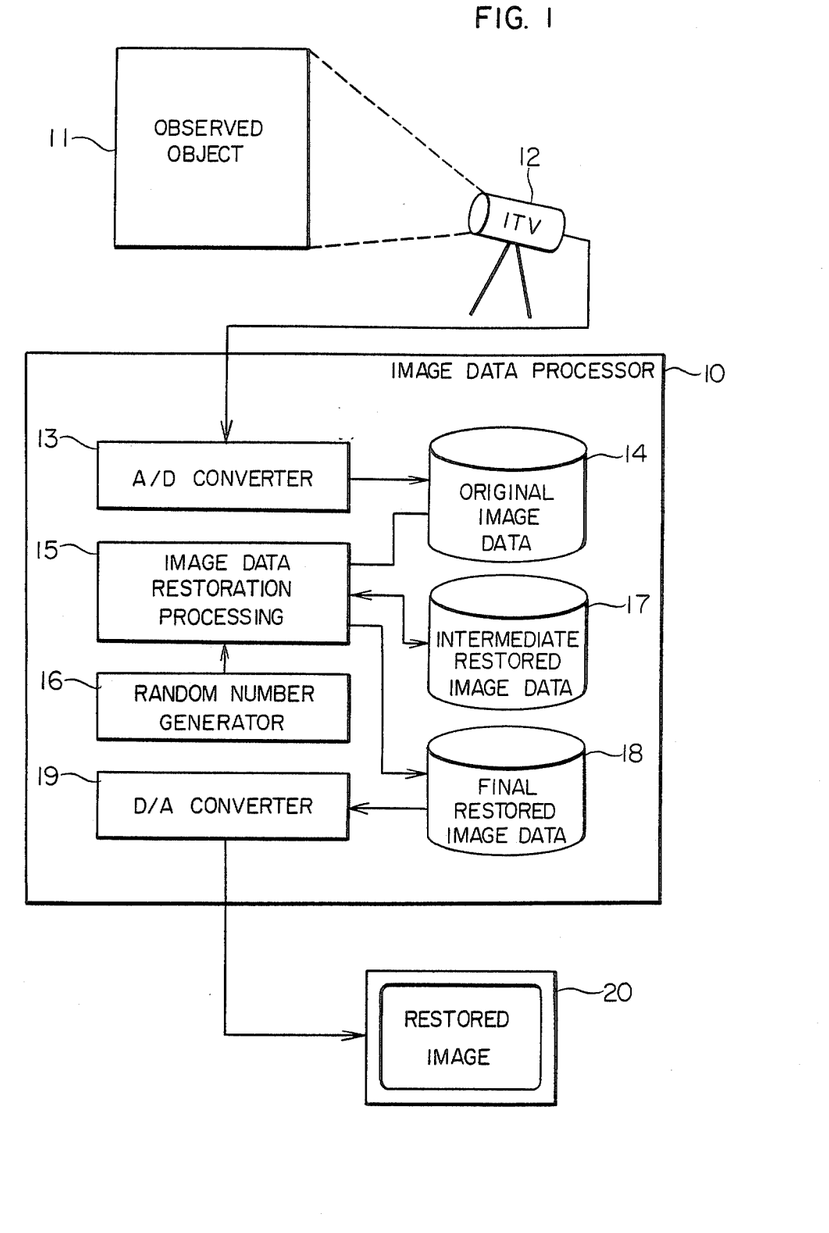
FIG. 1 is a block diagram illustrating the schematical construction of an image data processing system, to which this invention is applied.

FIG. 1 is a block diagram illustrating the schematical construction of an image data processing system, to which this invention is applied. Electric signals obtained by imaging an observed object (e.g. an IC chip) 11 by means of ITV camera 12 are sent to an image processing device 10 consisting of at least a processor and a memory, where they are subjected to an analogue-digital transformation and a quantization process 13 so that they are transformed into digital image data, and stored once in a file 14 as original image data. In these original image data are mixed, other than errors due to non-linear characteristics of the ITV camera 12, noises provoked by various factors. Then, the original image data are read out from the file 14 and subjected to a stochastic image restoration processing 15 on the basis of the image energy. In this way restored image data can be obtained by removing the noises without making the edge vague. For the stochastical treatment the Monte Carlo method is applied and the uniform random numbers necessary therefor are supplied by a random number generator 16. The processing is carried out by an iterative method and intermediate results are stored in a file 17. Restored image data are accumulated in a file 18. After that they are read out at need and displayed on a display device 20 after having been subjected to other image treatments or to an analogue/digital transormation 19.

The image restoration processing 15 according to this invention utilizes a quantity called image energy in this specification, which is defined as follows, as an index for determining the probability of the value of each of the pixels. The image energy E ($\{x_{i,j}\}$), when a pixel, which is at a position (i,j) on a two-dimensional image, (hereinbelow designated by pixel (i,j) has a gray level $x_{i,j}$, is represented by the following equation;

$$E(\{x_{i,j}\}) = U^d(\{x_{i,j}\}) + U^n(\{x_{i,j}\}) \tag{1}$$

where $U^d$ represents the image energy of the pixel itself (i.e. in the case where there are no noises) and $U^n$ represents the image energy added due to noises. In digitized image data, $x_{i,j}$ is quantized into a suitable level number of discrete values. For example, in a two-valued (white and black) image $x_{i,j}$ takes a value "0" or "1".

It is required that the image energy E defined by Eq. (1) has a property that, when the gray level $x_{i,j}$ of the pixel has the most probable value, the value is minimum. In order to give such a property to the image energy E, according to this invention, $U^d$ and $U^n$ in Eq. (1) are set as follows.

At first, since $U^d$ representing the original image energy is determined by the relative relation between the gray level of the object pixel and that of the pixels adjacent thereto, it can be given by the following equation:

$$U^d(\{x_{i,j}\}) = \sum_{<k,l>} U_1(x_{i,j}, x_{k,l}) + \sum_{<<k,l>>} U_2(x_{i,j}, x_{k,l}) + \ldots \tag{2}$$

Figure 2:
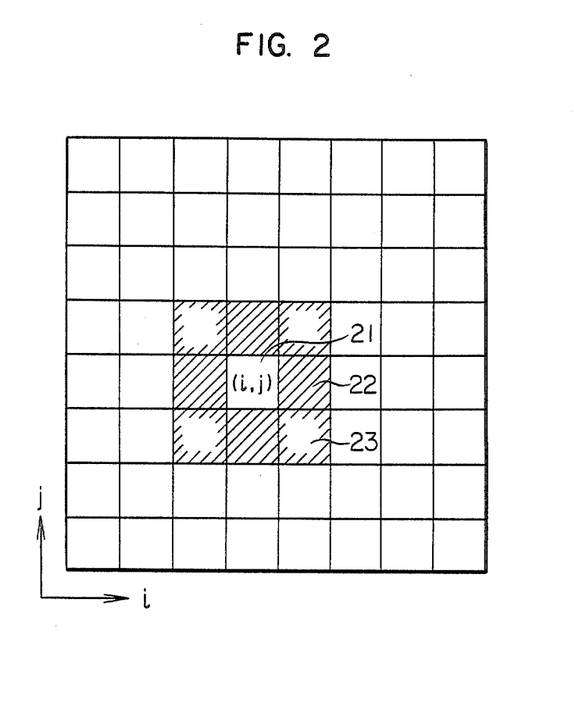
FIG. 2 is a scheme for explaining the relation between a pixel and the pixels adjacent thereto.

Here, referring to FIG. 2 indicating a part of an image, $$\sum_{<k,l>} U_1$$

in Eq. (2) represents the sum of the image energy of the first group of the pixels {(i,j−1), (i,j+1), (i−1,j), (i,j+1)}22, which are directly adjacent to the upper, lower, left and right sides of the object pixel (i,j) 21, and $$\sum_{<<k,l>>} U_2$$

represents the sum of the image energy of the second group of the pixels {(i−1,j−1), (i−1,j+1), (i+1,j−1), (i+1,j+1)}23, which are adjacent to the four corners of the object pixel (i,j) 21, followed by other terms for groups of pixels, which are located more and more distant from the object pixel.

Since the functions $U_1$, $U_2$, etc. are defined, for convenience' sake, for the image restoration processing and not physical energy, there is no principle to determine it uniformly. However, taking into consideration the fact that the Laplacian utilized often heretofore is an index indicating rapid variation of $x_{i,j}$, depending on the position, it is desirable that the Laplacian participates in the determination of the most probable $x_{i,j}$, i.e. the determination of the minimum value of the function E. In this way, since the Laplacian is an operator, to which the object pixel and those adjacent thereto are related, the term $U_2$ and those following it in Eq. (2) can be neglected.

In the state previously stated, where the gray level $x_{i,j}$ of the object pixel 21 is updated to its most probable value, the condition that the image energy E has its minimum value can be replaced by a condition that a probability formula containing E in its exponent $$\sim \exp(-E/\text{constant})$$

has its maximum value. Therefore, according to this invention, the following function, whose differential with respect to $x_{i,j}$ is the Laplacina;

$$U_1(x_{i,j}, x_{k,l}) = (x_{i,j} - x_{k,l})^2$$

is adopted as a function $U_1$ satisfying the condition stated above.

Substituting this function for $U_1$ in Eq. (2), where the term $U_2$ and those following it are neglected, the image energy $U^d$ can be represented as follows:

$$U^d(\{x_{i,j}\}) = \sum_{<k,l>} (x_{i,j} - x_{k,l})^2 \quad (3)$$

For verification, differentiating $U^d$ with respect to $x_{i,j}$, $$\frac{\partial U^d}{\partial x_{i,j}} = 2\{(x_{i,j} - x_{i-1,j}) + (x_{i,j} - x_{i+1,j}) +$$
$$(x_{i,j} - x_{i,j-1}) + (x_{i,j} - x_{i,j+1})\}$$
$$= -2\{[(x_{i+1,j} - x_{i,j}) - (x_{i,j} - x_{i-1,j})] +$$
$$[(x_{i,j+1} - x_{i,j}) - (x_{i,j} - x_{i,j-1})]\}$$
$$= -2\{\text{Laplacian}(x_{i,j})\}$$

can be obtained and thus it can be understood that the differential is proportional to the Laplacian.

Next differentiating it once more, $$\frac{\partial^2 U^d}{\partial x_{i,j}^2} = 8 > 0$$

is obtained. Therefore it is clear that the image energy has a minimum.

Now the image energy $U^n$ produced by noises is considered. In general, when the non-linear characteristics of the converter system, the gray level $y_{i,j}$ obtained through the converter system can be represented by the following equation;

$$y_{i,j} = f(x_{i,j}) + \xi_{i,j}$$

where $x_{i,j}$ represents the true gray level (i.e. gray level to be restored) and $\xi_{i,j}$ is the component due to the noises in the gray level. If $\xi$ has a Gaussian distribution, whose mean value is "0" (in reality the distribution of $\xi$ is not necessarily Gaussian, but even if it is supposed, it produces no difficulties in practice), its probability is proportional to $\exp(-\xi^2_{i,j}/2\sigma^2)$ ($\sigma^2$ is the dispersion of the noises). Consequently the image energy produced by the noises ($\xi_{i,j} = y_{i,j} - f(x_{i,j})$) is given by the following equation;

$$U^n(\{x_{i,j}\}) = \alpha[y_{i,j} - f(x_{i,j})]^2 \quad (4)$$

where $\alpha = \frac{1}{2}\sigma^2$.

According to this invention, the image energy E is defined by the following equation;

$$E(\{x_{i,j}\}) = \sum_{<k,l>} (x_{i,j} - x_{k,l})^2 + \alpha(y_{i,j} - f(x_{i,j}))^2 \quad (5)$$

which can be obtained by substituting the image energies $U^d$ and $U^n$ defined by Eqs. (3) and (4), respectively, for $U^d$ and $U^n$ in Eq. (1). Here the value of $\alpha$ is not critical, but it may be a roughly approximated value. Furthermore $\alpha$ is not necessarily constant, but it may vary in dependence on the gray level of the adjacent pixels. For example it may be represented by $$\alpha = \sum_{<k,l>} (x_{i,j} - x_{k,l})^2$$

The image restoration processing is one by which $x_{i,j}$ of each of the pixels is determined principally so that the value of Eq. (5) is minimum for all the pixels. For the sake of simplicity, supposing $f(x_{i,j}) = x_{i,j}$, i.e. that the converter system has no non-linearity and putting "0" for the differential of Eq. (5) with respect to $x_{i,j}$, $$\text{Laplacian}(x_{i,j}) = \alpha(x_{i,j} - y_{i,j}).$$

That is, in the state where the measured values $y_{i,j}$ are so modified that the image energy is minimum (i.e. the noises are eliminated), the Laplacian is proportional to the modification quantity. This fact shows that the Laplacian has, in general, a tendence to be conserved and further that small variations of the gray level in dependence on the position are apt to be removed and great variations are apt to remain. Consequently it can be expected to prevent that the edge is made vague.

On the other hand, since the noises are defined in Eq. (4) as a stochastic process, a stochastic procedure should be applied for determining $\{x_{i,j}\}$, where the image energy is minimum. For this reason a probability distribution G ($\{x_{i,j}\}$) indicated by the following equation (6) is defined and it is not tried to minimize the image energy, but rather to make this G greatest.

$$G(\{x_{i,j}\}) = \frac{1}{Z} \exp\left(-\sum_{i,j} E(\{x_{i,j}\})/T\right) \quad (6)$$

where Z is a normalization constant and T is a parameter, which is similar to the temperature for physical systems. This is described in the article stated previously. In general, a substance is liquid and has no determined form at a high temperature. But, with decreasing temperature it is solidified and finally it becomes to have a certain form. In the image data, when T is great, $x_{i,j}$ is apt to have a random value and the regulation for determination of $x_{i,j}$ that Eq. (6) is made greatest doesn't act strongly. With decreasing T the randomness decreases and finally the regulation for determination of $x_{i,j}$ becomes to act strongly. In the course of an iterative restoration processing stated later, when T decreases gradually from a great value, a true image is restored asymptotically from an original image containing noises and fixed. As stated later, it is not necessary to use directly Eq. (6) for calculating the optimum gray level of each of the pixels, but it is determined by Monte Carlo method using the regulation for determination derived from Eq. (6) whether the value determined by the preceding processing should be replaced by a value calculated by the last processing or not. The stochastic processing is realized in this way.

Now the processing for restoring an image by the stochastic method using Eqs. (5) and (6) will be explained. Since E ($\{x_{i,j}\}$) varies depending on the variation of the gray level of the closest pixels, it is extremely difficult to determine at once $\{x_{i,j}\}$, which makes the value of Eq. (6) greatest and therefore it is determined by an iterative method. Representing the gray level of the pixel (i,j) in the restored image in the intermediate stage obtained as the result of the P-th image data processing by $x_{i,j}^{(P)}$ and supporting that the value, which the gray level of each of the pixels can have, is quantized to the integers from O to M, the (P+1)-th image data processing is carried out for the pixel (i,j) in the following way.

The values obtained by the P-th processing, i.e. $\{x_{i,j-1}^{(P)}, x_{i,j+1}^{(P)}, x_{i-1,j}^{(P)}, x_{i+1,j}^{(P)}\}$ are applied for the value of the gray level $\{x_{k,l}\}$ of the first group of adjacent pixels in Eq. (5) and $x_{i,j}^{(P)}$ is applied for the measured value $y_{i,j}$. The value of E ($\{x_{i,j}\}$) is calculated, while substituting integers from O to M indicating the gray level (except for $x_{i,j}^{(P)}$ at that time) one after another for $x_{i,j}$ and $f(x_{i,j})$ and the gray level giving the minimum E ($\{x_{i,j}\}$) is stored as the corrected candidate value $\{x'_{i,j}^{(P+1)}\}$ of the object pixel, i.e. $\{x'_{i,j}^{(P+1)}\}$ can be represented as follows:

$$\{x'_{i,j}^{(P+1)}\} = \{x_{i,j}|\min_{x_{i,j}(\neq x_{i,j}^{(P)})} E(\{x_{i,j}, x_{k,l}^{(P)}\})\} \quad (7)$$

Theoretically $x'_{i,j}^{(P+1)}$ should be calculated, which makes the value of Eq. (6) greatest. However, since it is clear that Eq. (6) is greatest, when Eq. (5) is smallest, it is possible to calculate $x'_{i,j}^{(P+1)}$, starting from Eq. (5).

The judgment whether the gray level $x_{i,j}^{(P)}$ at that time of the object pixel should be replaced by the candidate value $x'_{i,j}^{(P+1)}$ or not is effected in the following way. Now, representing the image energy, when the gray level of the object pixel remains to be the value at that time, by E ($\{x_{i,j}^{(P)}\}$) and the image energy, when it is changed to $x'_{i,j}^{(P+1)}$, by E ($\{x'_{i,j}^{(P+1)}\}$), the value q obtained by dividing the value G ($\{x_{i,j}^{(P+1)}\}$) of Eq. (6), when the gray level of a relevant object pixel is changed to $x'_{i,j}^{(P+1)}$ and that of all the other pixels remains to be maintained, by the value G ($\{x_{i,j}^{(P)}\}$), when the gray level of all the pixels remains to be $x_{i,j}^{(P)}$, i.e.

$$q = \exp(-[E(\{x'^{(P+1)}_{i,j}\}) - E(\{x^{(P)}_{i,j}\})]/T) \quad (8)$$

is calculated. Whether the gray level of the object pixel should be replaced by the candidate value $x'_{i,j}^{(P+1)}$ or not is determined according to the Monte Carlo method, e.g. generating uniform random numbers $\eta$ ($0 \leq \eta \leq 1$) and depending on which is greater, $\eta$ or q, in the following way.

$$\begin{cases} q \geq \eta\colon \text{ in place of } x^{(P)}_{i,j}, x'^{(P+1)}_{i,j} \text{ is} \\ \qquad \text{adopted for } x^{(P+1)}_{i,j}. \\ q < \eta\colon x^{(P)}_{i,j} \text{ is adopted for } x^{(P+1)}_{i,j} \text{ as it is.} \end{cases}$$

Further, if $q \geq 1$, since naturally $q \geq \eta$, $x_{i,j}$ is updated. That is, if $E(\{x_{i,j}^{(P+1)}\}) \leq E(\{x_{i,j}^{(P)}\})$, $x_{i,j}$ is necessarily updated, but unless otherwise, it is updated with a certain probability, which is smaller with decreasing T. The value of T is set suitably so that it becomes smaller and smaller for every iteration (T(P+1)<T(P)).

Figure 6A:
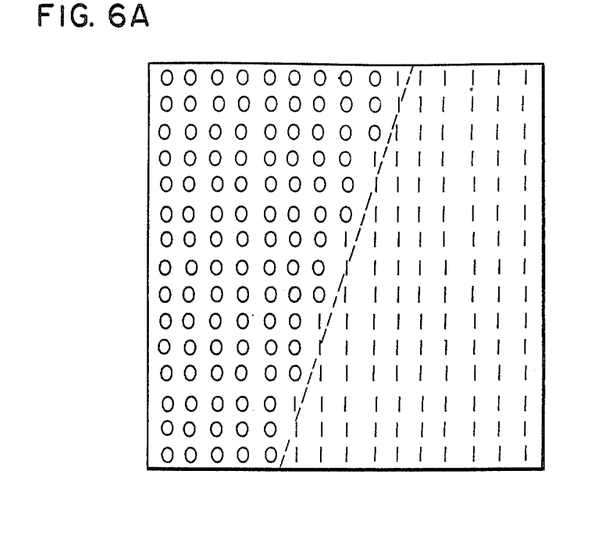
FIGS. 6A–6D are schemes for explaining a process for restoring data in a two-dimensional image.
Figure 6B:
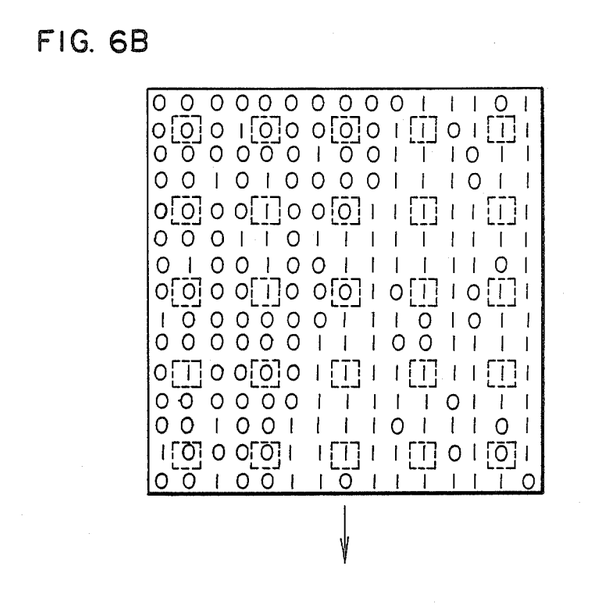

When parallel processing is possible by means of multiprocessor, pipeline-architecture, etc. for each iteration processing, it is advantageous to extract a suitable number of pixels selected for every three pixels in the i and j directions (e.g. pixels enclosed by dotted lines in FIG. 6(b)) as object pixels. Each of the pixels arranged with such an interval is suitable for the parallel processing, because its closest adjacent pixels are not contained in the closest pixels of any other object pixel.

Figure 3:
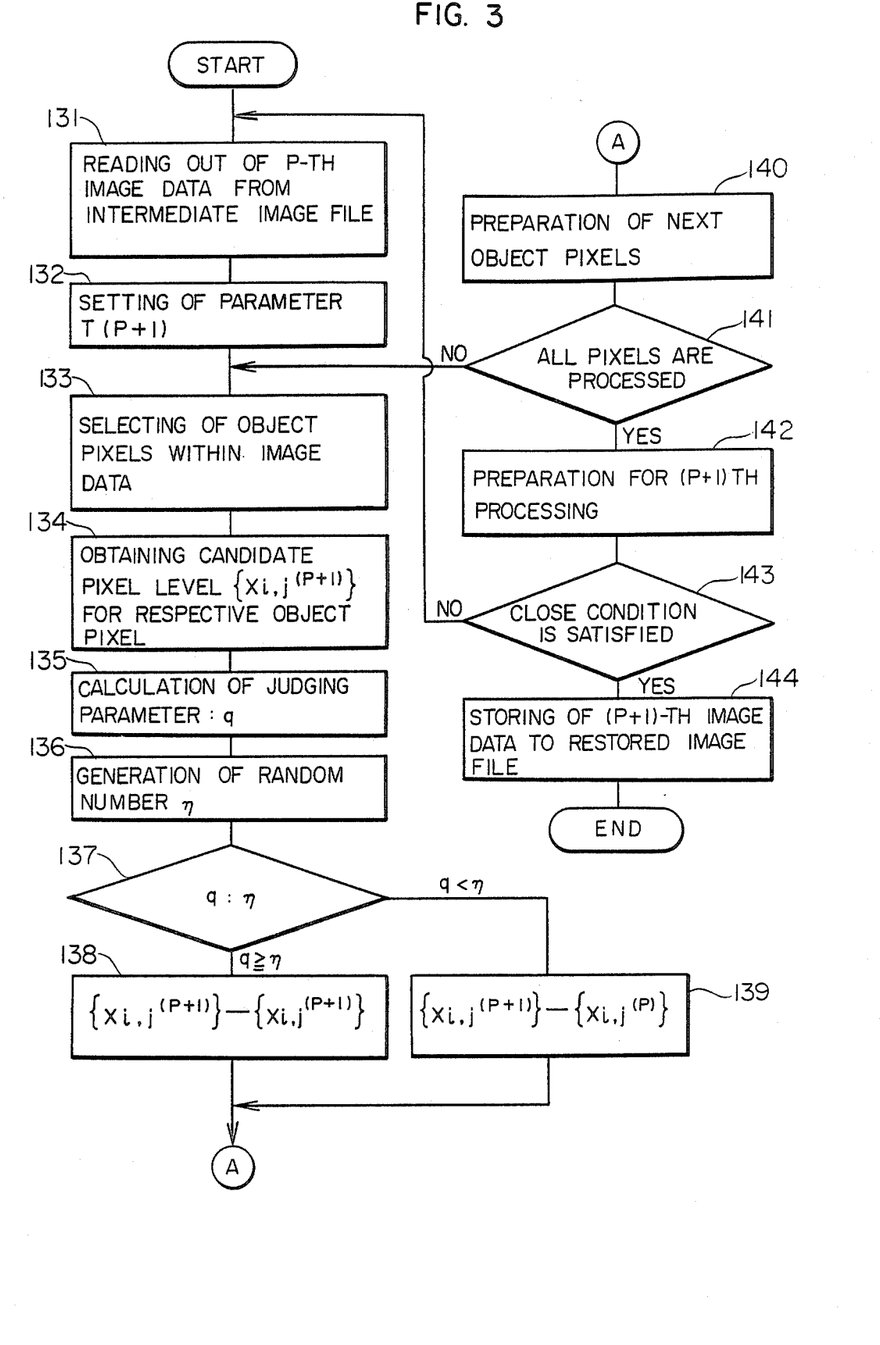
FIG. 3 is a flow chart indicating the steps to be followed in the image data processing according to this invention.

FIG. 3 is a flow chart indicating an example of the image restoration processing (15 in FIG. 1) according to the principle described above. It is supposed that a computer to be used is a pipeline computer, which can treat m pixels in parallel. At first, the intermediate restored image data in the file 17 obtained by the P-th iteration (for the first one original data in the file 14) are read out (Step 131) and a parameter T (P+1) (<T(P)) is set (Step 132). Then, m pixels to be treated are extracted for every 3 pixels in the i-direction (and also in the j-direction, if possible) and the gray levels $x_{i,j}^{(P)}$ of all the pixels are fixed (Step 133). $x'_{i,j}^{(P+1)}$ (except for $x_{i,j}^{(P)}$), which makes the value of Eq. (5) minimum, is calculated for the group of extracted object pixels by using Eq. (7) (Step 134). Subsequently the update judging parameter q is calculated by using Eq. (8) (Step 135). After that, uniform random number $\eta$ are generated by the random generator 16 (Step 136) and q and $\eta$ are compared with each other (Step 137). Then, if $q \geq \eta$, $x_{i,j}^{(P+1)}$ is adopted for $x_{i,j}^{(P+1)}$ (Step 138) and if not, $x_{i,j}^{(P)}$ is adopted for $x_{i,j}^{(P+1)}$ as it is (Step 139). When m object pixels have been treated, other m pixels are treated in the same way and this process is repeated, until all the pixels are treated (Steps 140, 141). When all the pixels have been treated, the first image processing is terminated and the (P+2)-th iteration is begun (Steps 141-143). When a suitable number of iterations have been terminated, the iteration is finished and the data of the restored image are stored in a file 18 (Steps 143, 144). The iteration may be finished, either when a predetermined number of iterative processings have been terminated or when the parameter T has been reduced to a predetermined value. Furthermore a finish instruction may be generated manually, when an operator recognizes almost no change, while observing successive intermediate restored image on a display device 20.

Figure 4A:
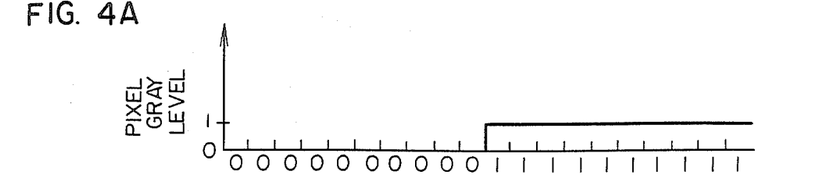
FIGS. 4A–4E are schemes for explaining a process for restoring a two-valued image, in the case where this invention is applied thereto.
Figure 4B:
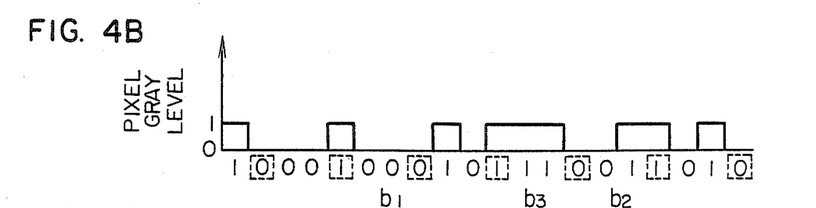

Now the processing described above will be explained below by using concrete data. FIGS. 4A to 4E are schemes for explaining a process for restoring a one-dimensional two-valued data (M=1). This is e.g. a processing of image data on one scanning line obtained in the case where the width of circuit patterns formed by etching, etc. in an IC fabrication process is examined. Ideally the data as indicated in FIG. 4A is to be obtained. However, in practice, the data as indicated in FIG. 4B are obtained as the original data in the file 14 in FIG. 1 because of defocusing, internal noises, external noises, etc. In this example it is supposed that $\alpha$ in Eq. (5) is "1" and that there is no nonlinearity in the transformation system (i.e. f(x)=x). Consequently the image energy is given by the following equation;

$$E(\{x_i\}) = \sum_{k=i\pm 1} (x_i - x_k)^2 + (y_i - x_i)^2$$

At first, a group of pixels selected for every 3 pixels, which are enclosed by dotted lines in FIG. 4B, are extracted and it is tried to update their gray levels. For example, for a pixel b1, if its gray level is not updated, $$E(\{x_i^{(P)}\}) = E(\{b1=1\}) = 2+0 = 2$$

and if its gray level is updated to "0", $$E(\{x_i'^{(P+1)}\}) = E(\{b1=0\}) = 0+1 = 1.$$

Therefore the judging parameter q can be written as follows;

$$q = \exp(-[1-2]/T)$$
$$= \exp(1/T) > 1$$

Consequently the gray level of the pixel b1 is changed from "1" to "0" without any comparison with a random number.

However, for another pixel b2, $$E(\{x_i^{(P)}\}) = E(\{b2=0\}) = 1+0 = 1$$

$$E(\{'_i^{(P+1)}\}) = E(\{b2=1\}) = 1+1 = 2.$$

Consequently $$q = \exp(-[2-1]/T) = \exp(-1/T).$$

When it is supposed that T is set to "1", the value of q is 0.368. At this time, if the value of a generated uniform random number $\eta$ is 0.660, $q < \eta$. Consequently the gray level of the pixel b2 is not updated.

Figure 4C:
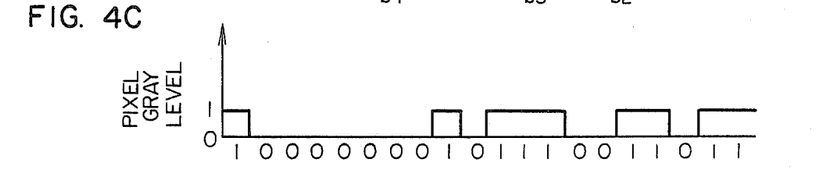
Figure 4D:
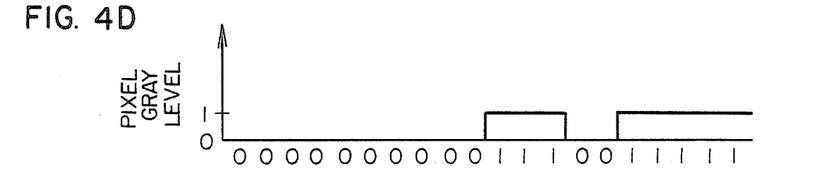
Figure 4E:
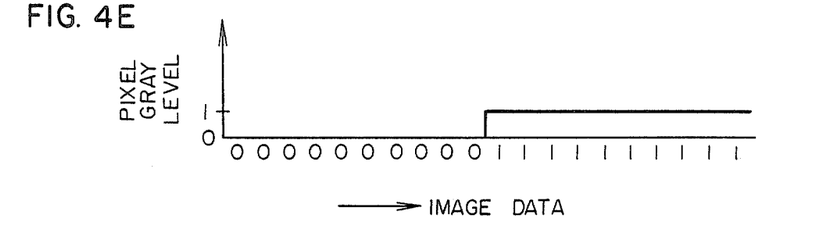

FIG. 4C indicates the state where all the pixels enclosed by dotted lines in FIG. 4B have been treated in the way described above; FIG. 4D indicates the state, where all the remaining pixels have been treated in the same way and the first iteration is terminated; and FIG. 4E indicates the restored state obtained after a suitable number of iterations, while reducing T.

On the other hand, since the updating of the gray level depends on the random number, several pixels in the restored image may have gray levels different from their real values. For example, the probability that the pixel b3 in FIG. 4B is "0" is not zero. However, in general, since image data consist of a great number of pixels (e.g. 512, 1024 or more per scanning line), even if the result described above is obtained for an extremely small number of pixels, this gives rise to no problems in practice.

FIGS. 5A to 5E shows an example of the restoration process of one-dimensional four-valued image data (M=3). It is supposed that original data are obtained in the form indicated in FIG. 5B as the result that noises are added to the data indicated in FIG. 5A, which should be originally obtained from a real image. The image energy represented by the following equation is adopted;

$$E(\{x_i\}) = \sum_{k=i\pm 1} (x_i - x_k)^2 +$$

$$\left\{ \sum_{k=i\pm 1} (x_i - x_k)^2 \right\} (y_i - x_i)^2,$$

where $$\alpha = \sum_{k=i\pm 1} (x_i - x_k)^2$$

Figure 5A:
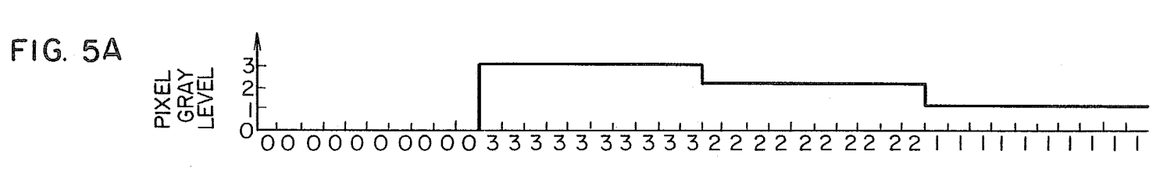
FIGS. 5A–5E are schemes for explaining a process for restoring a multi-valued image, in the case where this invention is applied thereto.
Figure 5B:
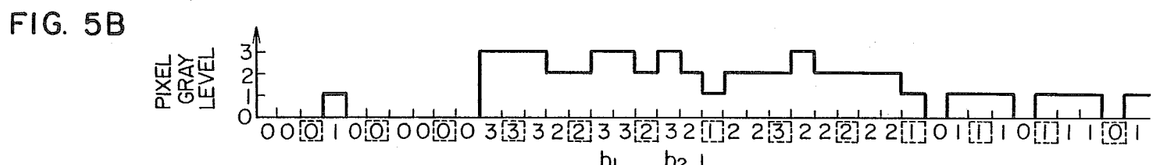

At first a group of pixels enclosed by dotted lines in FIG. 5B are extracted for every 3 pixels. For example, for the pixel b1, if its gray level is not updated, $$E(\{x_i^{(P)}\}) = E(\{b1=2\}) = 1+0 = 1$$

Further the image energies when its gray level is updated to "0", "1" and "3" are represented, respectively, as follows;

$$E(\{b1=0\}) = 13+13\times 4 = 65$$

$$E(\{b1=1\}) = 5+5\times 1 = 10$$

and $$E(\{b1=3\}) = 1+1\times 1 = 2$$

Consequently, "3" is selected as its corrected candidate value for $x_i'^{(P+1)}$ of the pixel b1. Now q is calculated as follows;

$$q = \exp(-[2-1]/T)$$
$$= \exp(-1/T).$$

When T is set to "2", the value of q is 0.607. At this time, supposing that the value of the generated uniform random number, $q < \eta$, and thus the gray level of the pixel b1 is not updated.

However, for the pixel b2, $$E(\{x_i^{(P)}\}) = E(\{b2=2\}) = 2$$

$$E(\{x'_i^{(P+1)}\}) = E(\{b2=3\}) = 0$$

and as the result the following equation is valid;

$$q = \exp(2/T) > 1.$$

Consequently the gray level of the pixel b2 is updated To "3".

Figure 5C:
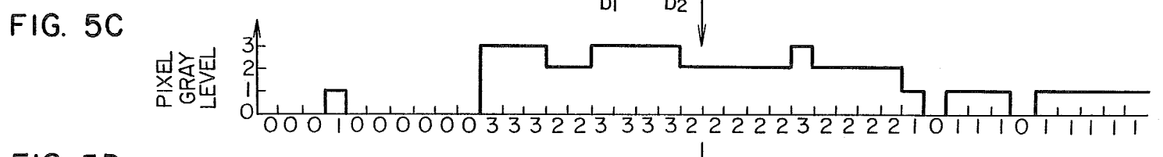
Figure 5D:
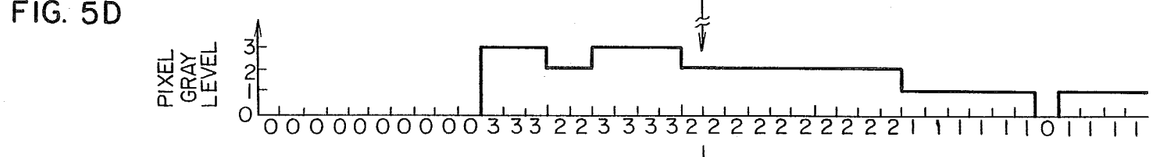
Figure 5E:
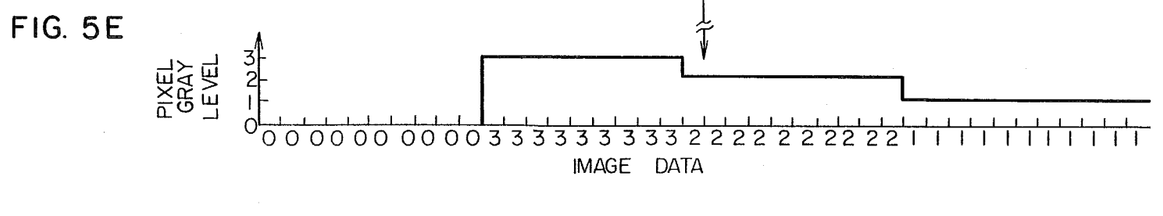

FIG. 5C indicates the state where all the pixels enclosed by dotted lines in FIG. 5B have been treated in the way described above; FIG. 5D indicates the state, where all the remaining pixels have been treated in the same way and the first iteration is terminated; and FIG. 5E indicates the restored state obtained after a suitable number of iterations, while reducing T. Although the position, where the gray level changes from "3" to "2", and the position, where the gray level changes from "2" to "1", differ by 1 pixel from those in FIG. 5A, the effected restoration is almost satisfactory.

FIGS. 6A to 6D indicate an example of restoration processes for two-dimensional two-valued data, where the following equation is adopted for the image energy;

$$E(\{x_{i,j}\}) = \sum_{<k,l>} (x_{i,j} - x_{k,l})^2 + \left\{ \sum_{<k,l>} (x_{i,j} - x_{k,l})^2 \right\} (y_{i,j} - x_{i,j})^2$$

Figure 6C:
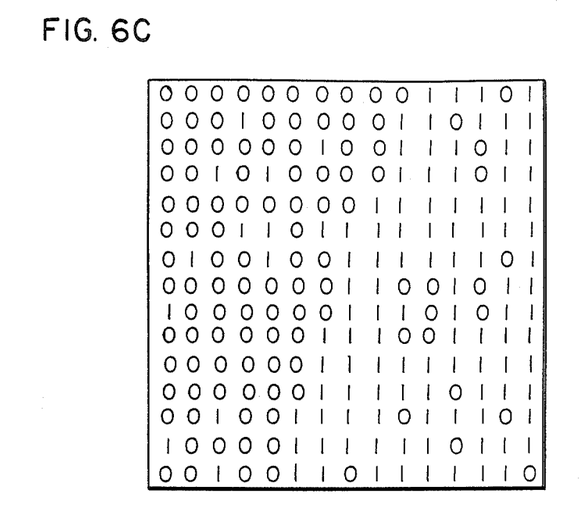
Figure 6D:
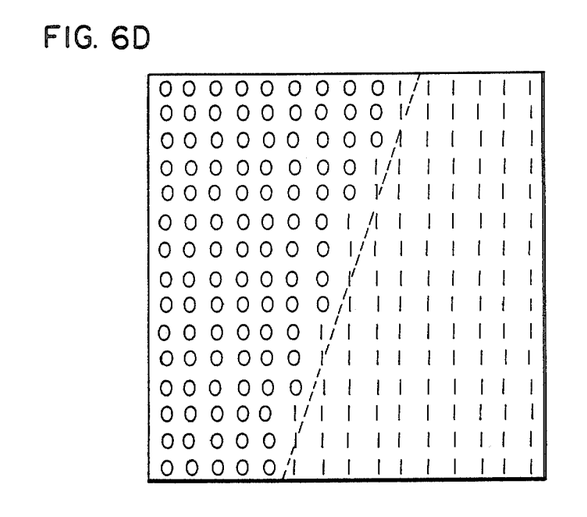

FIG. 6A indicates data, which should be obtained from a real image, and FIG. 6B shows a state, where noises are added to the data indicated in FIG. 6A. In FIG. 6B a group of pixels extracted for every three pixels in the vertical and horizontal directions are enclosed by dotted lines and the state, where these pixels have been treated, is shown in FIG. 6C. FIG. 6D indicates a restored image, where it can be recognized that the image has been almost perfectly restored.

Next an image processing device suitable for the image restoration processing stated above will be explained.

Figure 7:
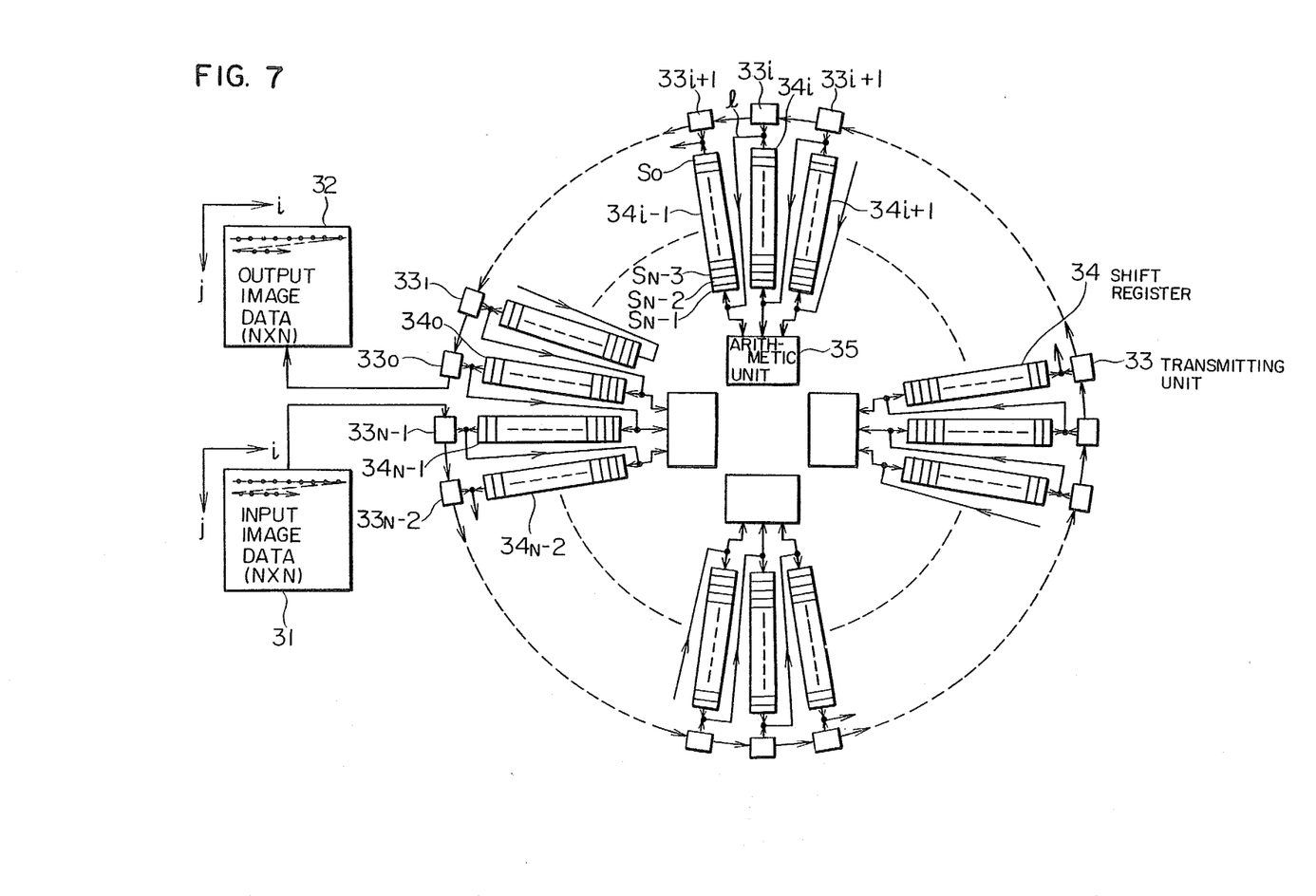
FIG. 7 is a scheme illustraing an example of the whole construction of image processing systems permitting to carry out the restoration processing of image data with a high speed.

FIG. 7 is a scheme illustrating an embodiment of the whole construction of an image processing device. In this embodiment image data of $N \times N$ pixels are treated by 4 operating devices in parallel. There are disposed N identical transmitting units 33, N identical N-stage shift registers 34, and 4 identical arithmetic units 35. Since the interconnection between one of the transmitting units 33 and one of the shift registers 34 is identical for all of them, only one transmitting unit $33_i$ will be described as the representative. At the input phase the transmitting unit $33_i$ sends data, which have been received from a transmitting unit $33_{i+1}$ through the succeeding transmitting unit $33_{i-1}$ or a line 1 to the input stage $S_{N-1}$ of a shift register $34_{i-1}$ and at the output phase it sends data, which have been received from the output stage $S_0$ of a shift registers $34_i$ or a transmitting unit $33_{i-1}$ to the succeeding unit $33_{i-1}$. The changeover between these transmitting modes is controlled in synchronism with the input or the output of image data in each line, as stated later. The input data are furnished to a transmitting unit $33_{N-1}$ pixel by pixel and the output data are sent out from a transmitting unit $33_0$. At the operation phase the data coming from the output stage $S_0$ of the shift register $34_i$ are sent through the line 1 to the input stage $S_{N-1}$ of the shift register $34_{i-1}$ and the data coming from the output stage $S_0$ of the shift register $34_0$ are sent to the input stage $S_{N-1}$ of the shift register $34_{N-1}$. In this way all shift registers $34_0$–$34_{N-1}$ are connected in series so as to form a single ring shift register.

Figure 8:
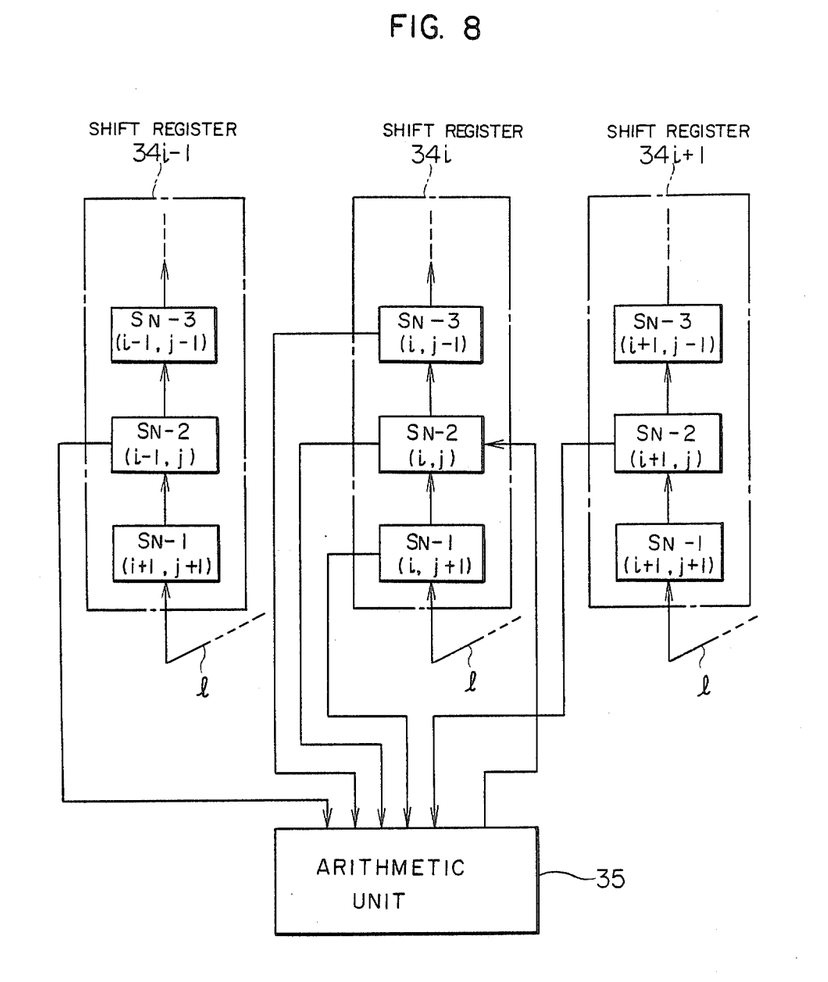
FIG. 8 is a scheme illustrating the relation in the connection between the shift registers and the operation devices in the system indicated in FIG. 7.

4 arithmetic units 35 are disposed at the 4 positions dividing equally the series of the shift registers 34 and connected with 3 successive shift registers (e.g. $34_{i-1}$, $34_i$, $34_{i+1}$), respectively. Each of the arithmetic units 35 reads out gray level data of the object pixel and the pixels closest thereto from the first 3 stages of the 3 shift registers 34 connected thereto and updates the gray level of the object pixel according to the algorithm stated previously. FIG. 8 indicates the interconnection between one of the arithmetic units 35 and the first 3 stages of the shift registers $34_{i-1}$, $34_i$ and $34_{i+1}$. The data stored in the stage $S_{N-2}$ of the shift register $34_{i-1}$, the stages $S_{N-3}$, $S_{N-2}$, $S_{N-1}$ of the shift register $34_i$ and the stage $S_{N-2}$ of the shift register $34_{i+1}$ are read out by the arithmetic unit 35. If the stage $S_{N-2}$ of the shift register $34_i$ holds data of the pixel (i,j), the stages $S_{N-1}$ and $S_{N-3}$ hold data of the pixels (i, j+1) and (i, j−1) and the stage $S_{N-2}$ of the shift registers $34_{i-1}$ and $34_{i+1}$ holds data of the pixels (i−1, j) and (i+1, j), respectively. Consequently the sta $S_{N-2}$ of the shift register $34_i$ corresponds to the object pixel and the others correspond to the pixels closest thereto. The new gray level of the object pixels calculated by the arithmetic unit 35 is written in the sta $S_{N-2}$ of the shift register $34_i$.

The device works as follows. At the input phase, the input image 31 is scanned by successive N horizontal scanning lines and each of the horizontal scannings produces gray level data of N pixels. Therefore the total number of pixels in this image is $N \times N$. The series of the image data produced by each of the horizontal scannings is transmitted along the series of the transmitting units 33 in synchronism with the advance of the horizontal scannings. At the end of one horizontal scanning the data of the last pixel $(i = N-1)$ enter the transmitting unit $33_{N-1}$ and the data of the first pixel (i=0) reach the transmitting unit $33_0$. At this time, each of the transmitting units 33 sends the image data, which it has received, through the line 1 to the stage $S_{N-1}$ of the shift register adjacent thereto and at the same time the content of each of the shift registers 34 is shifted towards the output stage $S_0$ by one stage. Consequently, when the scanning of one image has been terminated, the stages $S_0$ to $S_{N-1}$ of the shift register $34_{N-1}$ hold the data of the pixels (O,O) to (O, N−1) of the row O, respectively; the stages $S_0$ to $S_{N-1}$ of the shift register $34_{i-1}$ hold the data of the pixels (i, o) to (i, N−1) of the row i and finally the stages S to $S_{N-1}$ of the shift register $34_{N-2}$ hold the data of the pixels (N−1, O) to (N−1, N−1) of the row N−1.

When the input of all the pixels has been terminated, the processing proceeds to the operation phase and all the shift registers $34_0$–$34_{N-1}$ form a single large ring shift register, i.e. a ring, where they are connected in series through the line 1. In the input phase and the operation phase, the image data in the stages $S_{N-1}$ to $S_{N-3}$ of the 3 shift registers (e.g. $34_{i-1}$, $34_i$, $34_{i+1}$) connected with each of the arithmetic units 35 are subjected to the restoration processing using the algorithm described previously by the arithmetic units 35 through the connection indicated in FIG. 8. When the data make ¼ turn in the ring, all the pixels are subjected once to the restoration processing and one iteration (Steps 131-142 in FIG. 3) is terminated.

Figure 9:
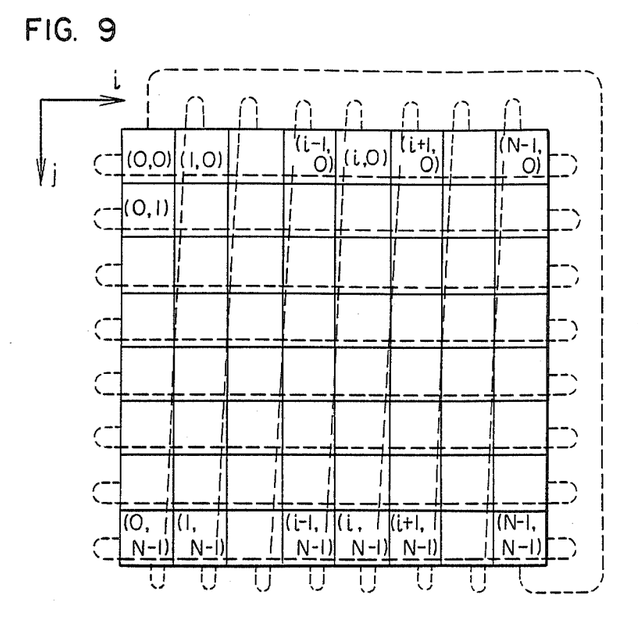
FIG. 9 is a scheme illustrating the positional relation among the pixels in the shift registers for the system indicated in FIG. 7.

In the ring shift register formed by the connection of the shift registers in series, as described above, the first row (O,O)-(O, N−1) follows the last row (N−1, O)-(N−1, N−1) of the pixel and consequently the first pixel (O,O) follows the last pixel (N−1, N−1). Further, the last pixel of each of the rows (i, N−1) is followed by the first pixel of the succeeding row (i+1, O). As the result, each of the pixels in the first row is the right closest pixel with respect to the pixel belonging to the same line in the last row and consequently each of the last row is the left closest pixel with respect to the pixel belonging to the same line in the first row. Further, the pixel belonging to the first line in each of the rows is the lower closest pixel with respect to the pixel belonging to the last line in the preceding row and consequently the pixel belonging to the last line in each of the rows is the upper closest pixel with respect to the pixel belonging to the first line in the succeeding row. In particular, the pixel (O,O) is the lower closest pixel with respect to the pixel (N−1, N−1) and consequently the latter is the upper closest pixel with respect to the former. FIG. 9 is a scheme illustrating the positional relation among the pixels in such a boundary.

Figure 10:
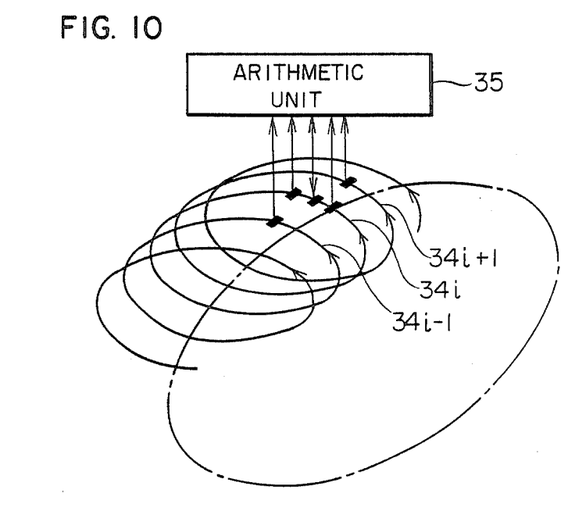
FIG. 10 is a scheme illustrating the relation between the direction of the circulation of the image data and the pixels inputted in the operation devices for the system indicated in FIG. 7.

In the manner described above, the image data of the succeeding rows flow continuously in the ring shift register formed by the connection of the shift registers 34 in series and each of the arithmetic units 35 treats a group of image data located in a predetermined relative position at a predetermined location in this loop. FIG. 10 is a scheme illustrating such a flow of the image data and the treatment position of the arithmetic units 35.

When a sufficient number N of circulations have been terminated, 4N iterations are completed. The stage $S_0$ of the shift registers $4_0$-$4_{N-1}$ holds the data of the pixels (O,O)−(N−1, O) belonging to the first line in the restored image; the stage $S_{j-1}$ holds the data of the pixels belonging to the j-th line; and the stage $S_{N-1}$ holds the data of the pixels belonging to the last line. At that time the content of the stage $S_0$ of each of the shift registers 34 is sent to the transmitting units 33 connected thereto. Then the content of these transmitting units is shifted to the unit $33_0$ located at the output position and the first line of the output image 2 is obtained from the unit $33_0$. The following lines of the output image 2 are outputted in the same way.

The number of arithmetic units 35 is not limited to 4. A very large number of arithmetic units can be disposed along the series of the shift registers 34 and further arithmetic units can be connected to intermediate stages of the shift registers 34. The processing time is inversely proportional to the number of the arithmetic units. The addition and the removal of arithmetic units are easy. Even if a part of the arithmetic units cease their function because of troubles, etc., there are no influences except for elongation of the treatment time. The shift registers may be realized by using memory devices having the FIFO function. The order of the input of the image data and their allocation to groups of shift registers are arbitrary, as far as the relative position of the pixels in the input image is held. For example the image data of the succeeding lines may be stored in succeeding shift registers 34. Concerning the random number generator, either each of the arithmetic units may be provided with an own random number or a single random number generator may be used in common for all the arithmetic units. A host computer may be disposed for the control of in/output and other interfaces.

Furthermore, according to this structure, in each of the iterations of the processing, the value of the updated pixel is used as the value of one of the pixels closest to that treated thereafter. At this point it differs from that the value of the pixels other than the object pixel is fixed to the value obtained by the directly preceding iteration according to the basic algorithm described above. However the result of a large number of iterations according to the Monte Carlo method is not influenced by such a difference.

This invention can be applied, apart from the image restoration, to intensification of image, detection of edge and other various image processings by modifying suitably Eq. (5) giving the image energy. The combination of the shift register stages connected with the arithmetic units 35 is determined in accordance with the algorithm of the operation. It is possible to treat larger images by suitably interconnecting a plurality of devices indicated in FIG. 7 concerning the connection between their input and output terminals and that between the shift registers.

Since the device according to this invention has an iterative structure, whose main component is memory devices, it is suitable to be fabricated in the form of LSI.

As it can be understood from the above explanation, by the image data processing method according to this invention, it is possible to make the detection of the pattern edge and the elimination of noises practically consist with each other and also to effect treatments in parallel. Consequently it is possible to realize a high speed image restoration system and thus it is accelerated to introduce the image processing system to various fields (e.g. object recognition by remote sensing, making a data base from literatures including figures, office automation including image processing, etc.).

I claim:

1. An image data processing method for treating first image data consisting of a plurality of pixels having values corresponding to their gray level, several of which contain noise components, and transforming them into second image data, in which the noise components are reduced or eliminated, comprising;

a first step for selecting pixels $x_{i,j}$, which are objects to be treated, whose gray level value is to be updated, from said first image data;

a second step for obtaining candidate values $\{x'_{i,j}\}$ for the gray level, which should be given to said object pixels $x_{i,j}$ on the basis of a function $E(\{x_{i,j}\})$ consisting of a first variable term $U^d(\{x_{i,j}\})$, whose differential with respect to the gray level $\{x_{i,j}\}$ of the object pixel is proportional to the Laplacian with respect to the gray level at the position of the object pixel in the image and a second variable term $U^n(\{x_{i,j}\})$, which is proportional to the square of the gray level of the noise components contained in the object pixel;

a third step for obtaining q corresponding to the ratio of the probability $G(\{x'_{i,j}\})$ in the case where the gray level of said object pixel $x_{i,j}$ is replaced by said candidate value $\{x'_{i,j}\}$, using a probability formula $G(\{x_{i,j}\})$ including said function in its exponent, to the probability $G(\{x_{i,j}\})$ in the case where the object pixel $x_{i,j}$ is held to be the value at that time $\{x_{i,j}\}$; and a fourth step for replacing the gray level of said object pixel by the candidate value $\{x'_{i,j}\}$, according to results obtained by comparing said value q with a random number $\eta$, said first to fourth steps being performed for all the pixels of said first image data in order to obtain said second image data.

2. An image data processing method according to claim 1, in which said second image data are treated as new first image data and said first to fourth steps are repeated for all the pixels of said new first image data.

3. An image data processing method, according to claim 2, in which in said second step, the value, which makes said function E ($\{x_{i,j}\}$) smallest, except for the value at that time of said object pixel, is selected as the candidate value $\{x'_{i,j}\}$ among a plurality of values previously prepared indicating gray levels.

4. An image data processing method according to claim 3, in which said function E ($\{x_{i,j}\}$) can be given by $$E(\{x_{i,j}\}) = \sum_{<k,l>} (x_{i,j} - x_{k,l})^2 + \alpha(y_{i,j} - f(x_{i,j}))^2,$$

where $x_{k,l}$ is the value of the gray level of the group of pixels directly adjacent to the sides of the object pixel $x_{i,j}$; $y_{i,j}$ is the value of the gray level at that time of the object pixel; $f(x_{i,j})$ is the value corresponding to the true gray level of the object pixel obtained through the transformation system for transforming image signals into said first image data; and $\alpha$ is a coefficient, and in said second step, the candidate value, which makes E ($\{x_{i,j}\}$) smallest, is selected by applying the value of the gray level, which the corresponding pixel in said first image data has, for $y_{i,j}$ and $x_{k,l}$ in said equation and applying the candidate value $\{x'_{i,j}\}$ for $x_{i,j}$ and $f(x_{i,j})$.

5. An image data processing method according to claim 4, in which $\alpha$ is a variable, which varies, depending on the gray level of the pixels adjacent to the object pixel.

6. An image data processing method according to claim 2, in which said probability formula G ($\{x_{i,j}\}$) is represented by $$G(\{x_{i,j}\}) = \frac{1}{Z} \exp\left(-\sum_{i,j}(\{x_{i,j}\})/T\right),$$

where Z is a constant and T is a parameter, which is reduced, depending on the number of iterations of the processing of transformation from said first image data to said second image data.

7. An image data processing method according to claim 4, in which said probability formula G ($\{x_{i,j}\}$) is represented by $$G(\{x_{i,j}\}) = \frac{1}{Z} \exp\left(-\sum_{i,j}(\{x_{i,j}\})/T\right),$$

where Z is a constant and T is a parameter, which is reduced, depending on the number of iterations of the processing of transformation from said first image data to said second image data.

8. An image data processing method according to claim 5, in which said probability formula G ($\{x_{i,j}\}$) is represented by $$G(\{x_{i,j}\}) = \frac{1}{Z} \exp\left(-\sum_{i,j}(\{x_{i,j}\})/T\right),$$

where Z is a constant and T is a parameter, which is reduced, depending on the number of iterations of the processing of transformation from said first image data to said second image data.

9. An image data processing method according to claim 2, in which in said second step, the value, which makes said probability formula G ($\{x_{i,j}\}$) including said function E ($\{x_{i,j}\}$) in its exponent greatest, except for the value at that time of said object pixel, is selected as the candidate value $\{x'_{i,j}\}$.

10. An image data processing method, according to claim 9, in which said probability formula G ($\{x_{i,j}\}$) is represented by $$G(\{x_{i,j}\}) = \frac{1}{Z} \exp\left(-\sum_{i,j}(\{x_{i,j}\})/T\right),$$

where Z is a constant and T is a parameter, which is reduced, depending on the number of iterations of the processing of transformation from said first image data to said second image data, and said function E ($\{x_{i,j}\}$) can be given by $$E(\{x_{i,j}\}) = \sum_{<k,l>} (x_{i,j} - x_{k,l})^2 + \alpha(y_{i,j} - f(x_{i,j}))^2,$$

where $x_{k,l}$ is the value of the gray level of the group of pixels directly adjacent to the sides of the object pixel $x_{i,j}$; $y_{i,j}$ is the value of the gray level at that time of the object pixel; $f(x_{i,j})$ is the value corresponding to the true gray level of the object pixel obtained through the transformation system for transforming image signals into said first image data; and $\alpha$ is a coefficient, whereby the candidate value, which makes G ($\{x_{i,j}\}$) greatest, is selected by applying the value of the gray level, which the corresponding pixel in said first image data has, for $y_{i,j}$ and $x_{k,l}$ in said equation and applying the candidate value $\{x'_{i,j}\}$ for $x_{i,j}$ and $f(x_{i,j})$.

11. An image data processing method according to claim 1, in which in said first step, a plurality of pixels located on said image with a predetermined interval to each other are selected simultaneously from said first image data and said second to said fourth steps are performed in parallel with respect to said plurality of said object pixels.

12. An image data processing method for treating first image data consisting of a plurality of pixels having values corresponding to their gray level, several of which contain noise components, and transforming them into second image data, in which the noise components are reduced or eliminated, comprising:

a first step for selecting pixels $x_{i,j}$, which are processing objects, whose gray level value is to be updated, from said first image data;

a second step for obtaining candidate values $\{x'_{i,j}\}$ for the gray level, for which, by applying a plurality of values previously prepared, indicating the gray level of the pixels, one after another to a function E ($\{x_{i,j}\}$) consisting of a first variable term $U^d(\{x_{i,j}\})$, whose differential with respect to the gray level $\{x_{i,j}\}$ of the object pixel is proportional to the Laplacian with respect to the gray level at the position of the object pixel in the image and a second term $U^n(\{x_{i,j}\})$, which is proportional to the square of the gray level of the noise components contained in the object pixel, and for selecting a candidate value of the gray level, which makes a probability, whose value is determined, depending on said function, greatest; and a third step for judging by a stochastic method whether the value of the gray level at that time for said object pixel should be replaced by said candidate value or not and for effecting the replacement process depending on the judgment result;

said first to third steps being performed for all the pixels of said first image data to obtain said second image data.

13. An image data processing system for treating first image data consisting of a plurality of pixels having values corresponding to their gray level, several of which contain noise components, and transforming them into second image data, in which the noise components are reduced or eliminated, comprising:

a plurality of multistage shift register means, each of which holds a plurality of pixel data and shifts them;

connecting means for forming a single ring shift register mechanism by connecting said plurality of shift register means in series in the form of a ring;

a plurality of operating means for performing operations of same type connected with several particular stages in said ring shift register mechanism; and input means for distributing inputted image data to said plurality of shift register means so that the relative position of the pixels in the inputted image is maintained;

whereby said operating means perform operations, which make a probability calculated on the basis of the image energy, which is a function of the values of the image data, greatest by the Monte Carlo method.

* * * * *